W. T. YOUNG & J. CHAPMAN.
METHOD OF STERILIZING SOIL FOR TOBACCO PLANT BEDS, &c.
APPLICATION FILED FEB. 19, 1917.
1,222,253.
Patented Apr. 10, 1917.
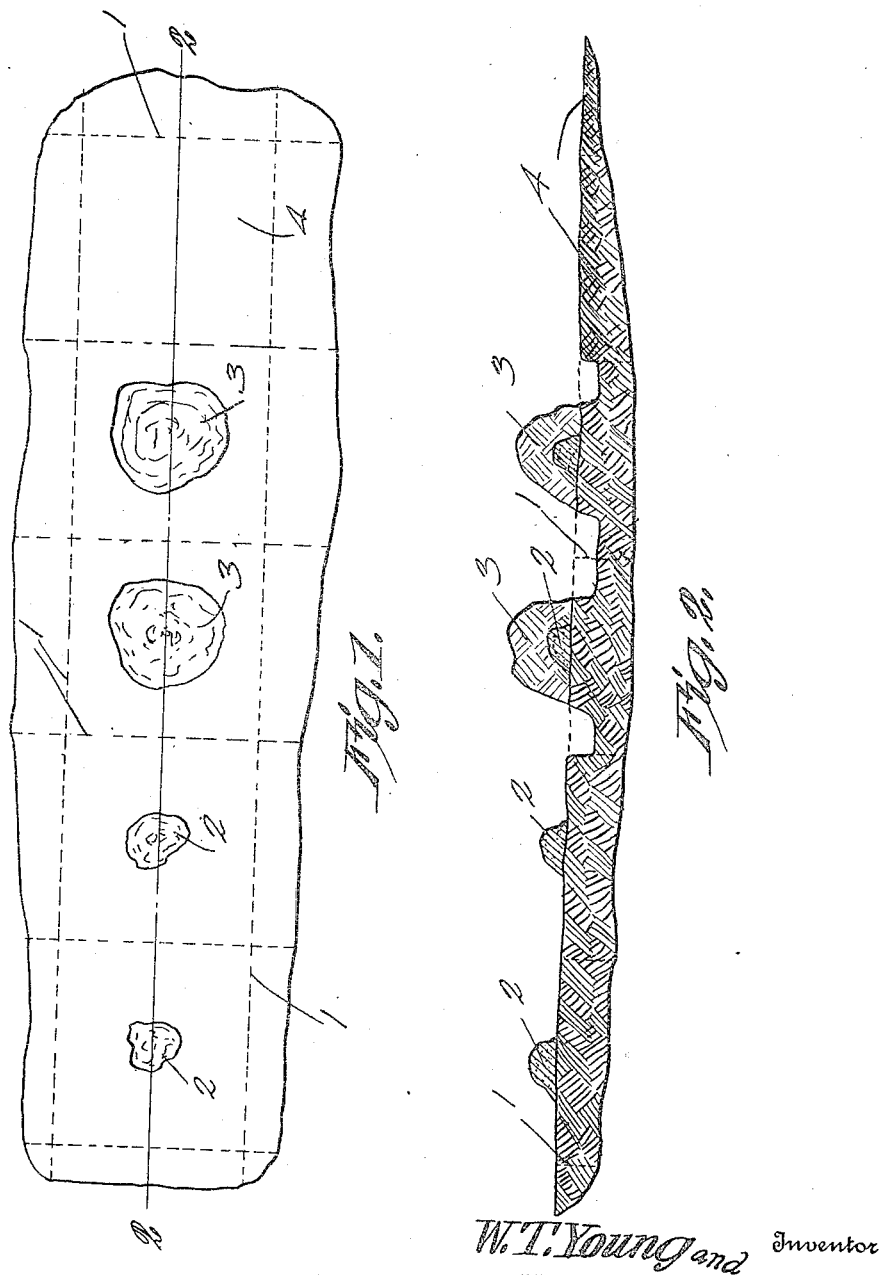
W. T. Young and
J. Chapman, Inventor

UNITED STATES PATENT OFFICE.

WILLIAM T. YOUNG AND JAMES CHAPMAN, OF ALLENSVILLE, KENTUCKY.

METHOD OF STERILIZING SOIL FOR TOBACCO-PLANT BEDS, &c.

1,222,253.  Specification of Letters Patent.  Patented Apr. 10, 1917.

Application filed February 19, 1917. Serial No. 149,525.

*To all whom it may concern:*

Be it known that we, WILLIAM T. YOUNG and JAMES CHAPMAN, citizens of the United States, residing at Allensville, in the county of Todd, State of Kentucky, have invented a new and useful Method of Sterilizing Soil for Tobacco-Plant Beds, &c., of which the following is a specification.

This invention relates to a new and useful method of sterilizing soil for tobacco plant beds, etc., one of the objects of the invention being to reduce the cost of effecting the sterilization by simplifying the method pursued, and to insure uniform treatment of the bed.

With the foregoing and other objects in view the invention consists in certain novel steps in the method as hereinafter more fully described and pointed out in the claims, reference being had to the accompanying drawings which show the various steps of the method constituting the present invention.

In said drawings:—

Figure 1 is a plan view of a portion of a bed for tobacco plants and the like, the same being shown in various stages of preparation.

Fig. 2 is a section on line 2—2 Fig. 1.

Referring to the figures by characters of reference it will be noted that the bed for the tobacco plants or the like is first divided into sections or squares by imaginary lines 1. A pile of unslaked lime shown at 2 is placed at the center of each of these sections, after which the surface soil is scraped up from around the pile of lime and onto the said pile as at 2, thus leaving mounds of dirt each of which houses a pile of unslaked lime. Before the surface soil is piled on the lime, said lime is saturated with water. Thus it will be seen that after the surface soil has been piled over the slaking lime, said soil will be thoroughly saturated with the lime and will become fully sterilized. Thus all seeds contained in the surface soil will be destroyed and after the completion of the sterilizing process the soil can be spread out over the ground. In the drawings several steps of the process have been illustrated. At 2 in Figs. 1 and 2 the lime has been shown piled on the ground and at 3 the surface soil has been shown piled up over the slaking lime. The final process of spreading out the sterilized soil with the lime mixed therewith has been indicated at 4.

Heretofore for the purpose of sterilizing or preparing tobacco beds, it has been the practice to burn brush upon the soil or to direct steam into pans placed over the soil. Such methods, however, have been slow and expensive and have not been reliable. The method set forth in the present application, however, is quick, inexpensive and efficient.

What is claimed is:—

1. The herein described method of preparing soil for tobacco plant beds and the like, which consists in piling unslaked lime on the soil, saturating the lime with water, piling the surface soil over the slaking lime to form a mound, and finally, after the completion of the slaking process, leveling the mound.

2. The herein described method of preparing beds for tobacco plants and the like, which consists in dividing the bed into sections, placing at the center of each section a pile of unslaked lime, pouring water on said pile, scraping the surface soil in said section to form a mound extending over the pile of slaking lime, and finally leveling the mound.

In testimony that we claim the foregoing as our own, we have hereto affixed our signatures in the presence of two witnesses.

WILLIAM T. YOUNG.
JAMES CHAPMAN.

Witnesses:
KARL RUSSELL,
THOS. PEPPER.

Copies of this patent may be obtained for five cents each, by addressing the "Commissioner of Patents, Washington, D. C."